UNITED STATES PATENT OFFICE.

ROGER WILLIAM WALLACE AND EUGENE WASSMER, OF LONDON, ENGLAND.

PROCESS FOR THE PRODUCTION OF NITROGEN.

1,154,145.

Specification of Letters Patent. Patented Sept. 21, 1915.

No Drawing. Application filed June 17, 1912. Serial No. 704,144.

*To all whom it may concern:*

Be it known that we, ROGER WILLIAM WALLACE and EUGENE WASSMER, of London, England, have invented a new and useful Improvement in Processes for the Production of Nitrogen, of which the following is a description.

Our invention relates to a process of producing, on a commercial scale, nitrogen of an unusually high degree of purity and this by passing a current of gas which contains nitrogen and oxygen through a vessel in which phosphorus is in a condition to be oxidized, whereby the oxygen of the gaseous mixture combines with the phosphorus to form anhydrids of phosphorus which are sprayed with water to form acids of phosphorus whereby the nitrogen is left free and can be utilized.

The gas which contains nitrogen and oxygen may be atmospheric air, or furnace or other gases mixed with atmospheric air. In order to produce nitrogen of an unusually high degree of purity, this gas is purified of all admixtures other than nitrogen and oxygen, during some convenient stage of the process. Thus if atmospheric air be the gaseous mixture of oxygen and nitrogen, this is freed of carbon dioxid and moisture in any of the well known ways and if furnace gases mixed with air are used as the containers of nitrogen and oxygen, these, at some stage of the process, are freed of such impurities as carbon monoxid, carbon dioxid, sulfureted hydrogen and other sulfur compounds by any known method so that the final result is the same as if we had started with a gaseous mixture of oxygen and nitrogen only. Or we may use the waste gases arising from the production of sulfuric acid in the common lead chamber process or the catalytic method of contact, in which case about the only impurity to be removed is a small quantity of carbon dioxid. Similarly we may use the waste gages of gas engines.

The phosphorus may be obtained from any convenient source as by crushing phosphatic ores, mixing them with charcoal, coke, with charcoal or coke and silica, or other suitable reducing agent and distilling off the phosphorus in a closed furnace in the ordinary way.

In practising our invention we proceed as follows: Two chambers or towers are placed immediately in connection with furnaces suitable for the distillation of phosphorus. These towers are constructed of any suitable refractory material, and filled with refractory and acid resisting material in such a manner as to present large surfaces on to which phosphorus may be distilled from a phosphorus furnace and condensed. These towers are placed in parallel, the gases issuing from the phosphorus distillation furnace passing through them alternately, and depositing the phosphorus which they contain. The towers are maintained at a sufficiently low temperature to secure the necessary deposit. When one of these towers has been saturated with phosphorus its function as a condenser is at an end, and the gases coming from the phosphorus distillation furnace are then caused to pass through the other tower. After a tower has been saturated with phosphorus, that is after it has been used as a condensing tower, it is thereupon used as a separating tower. To this end, a mixture of oxygen and nitrogen is passed into the tower so that the phosphorus in the tower is burned, which means it combines with the oxygen to form anhydrids of phosphorus. There issues from the separating tower a mixture composed of anhydrids of phosphorus and nitrogen. These products are passed through a water tower or tank to absorb and combine with the anhydrids of phosphorus to produce acids of phosphorus and to leave the nitrogen free. The acids of phosphorus may be saturated with any base to form the required phosphate as a by-product of the present process.

It will be understood that if desired we may deposit the anhydrids of phorphorus as a powder.

It is clear that while one tower is utilized as a condensing tower, the other may be used as a separating tower. It is further clear that we may use several towers, in series, instead of a single tower.

In the case of the mixture of nitrogen and oxygen containing carbon monoxid and carbon dioxid we first oxidize the carbon monoxid into carbon dioxid with an excess of air before introducing the gases into the separating tower, and, preferably also before the gases are passed into the separating tower, we absorb the carbon dioxid thus formed by spraying the mixture with ammonia solution to convert the carbon dioxid into ammonium carbonate which may be converted into soda in the well known way as by-products of the present process. If for any reason the existence of carbon monoxid as an impurity in the nitrogen is not objectionable then this preliminary oxidation of the carbon monoxid is unnecessary but any existing carbon dioxid may be absorbed as above described before or after the gases are passed into the separating tower.

If too much air is introduced into the separating tower during the process, then the mixture of gases obtained after the elimination of the anhydrids and the carbon dioxids will contain a certain amount of oxygen with the nitrogen. This oxygen may be removed by means of a fresh combustion of phosphorus. If, on the contrary, an insufficient quantity of air is introduced into the separating tower, then phosphorus as well as anhydrids of phosphorus may be distilled over and this phosphorus may be collected and utilized as may be desired.

By means of our process nitrogen of any desired degree of purity can be obtained.

Whether or not the impurities in the gaseous mixture of nitrogen and oxygen are removed before, during or after the passage through the separating tower will be determined by the circumstances.

It will be understood that in lieu of or in addition to treatment in a saparating tower as above described the gases may be treated by bubbling them through liquid phosphorus. Thus for example treatment in the separating tower may be preceded by bubbling the gases through liquid phosphorus contained in the bottom of the tower. Again, instead of condensing the phosphorus vapor in a tower as described we may burn it directly with the gases to be treated in any suitable burner.

We claim:—

1. The method of producing nitrogen for commercial purposes from a mixture of gases containing carbon monoxid and nitrogen, which consists in oxidizing the carbon monoxid into carbon dioxid with an excess of air, eliminating the carbon dioxid by treatment with ammonia solution to form ammonium carbonate and thereafter passing the mixture of gases containing nitrogen and oxygen through a chamber containing phosphorus.

2. The method of producing nitrogen for commercial purposes which consists in passing phosphorus vapors into a chamber or tower containing material on which the phosphorus may condense, and thereupon passing a current of a gaseous mixture of oxygen and nitrogen through said chamber to cause the formation of anhydrids of phosphorus and to render the nitrogen available.

3. The method of producing nitrogen for commercial purposes which consists in passing phosphorus vapors into a chamber or tower containing material on which the phosphorus may condense, thereupon passing a current of a gaseous mixture of oxygen and nitrogen through said chamber to cause the formation of anhydrids of phosphorus and nitrogen and passing these products through a water tower to combine with the anhydrids of phosphorus to produce acids of phosphorus and to leave the nitrogen free, substantially as described.

In witness whereof we have signed our names to this specification in the presence of two subscribing witnesses.

ROGER WILLIAM WALLACE.
EUGENE WASSMER.

Witnesses:
H. D. JAMESON,
O. R. LIDDON.